United States Patent [19]
Mitchell, Jr. et al.

[11] Patent Number: 5,930,023
[45] Date of Patent: Jul. 27, 1999

[54] ELECTROCHEMICAL DISPLAY AND TIMING MECHANISM WITH MIGRATING ELECTROLYTE

[75] Inventors: Chauncey T. Mitchell, Jr.; Gerrit L. Verschuur, both of Lakeland, Tenn.; Mark A. Shadle; David M. Good, both of Peachtree City, Ga.; Robert Parker, Palm Desert, Calif.

[73] Assignee: Wisconsin Label Corporation, Algoma, Wis.

[21] Appl. No.: 09/067,114

[22] Filed: Apr. 27, 1998

Related U.S. Application Data

[60] Provisional application No. 60/045,051, Apr. 28, 1997.
[51] Int. Cl.$^6$ .......................... G02F 1/153; H01M 10/48
[52] U.S. Cl. .......................... 359/270; 359/272; 359/274; 429/93
[58] Field of Search .................. 359/265, 270, 359/272, 274; 429/93

[56] References Cited

U.S. PATENT DOCUMENTS

| | | | |
|---|---|---|---|
| 3,045,179 | 7/1962 | Maier | 368/114 |
| 3,891,457 | 6/1975 | Auborn | 429/109 |
| 3,940,205 | 2/1976 | Crandall et al. | 359/267 |
| 4,120,568 | 10/1978 | Deb et al. | 359/274 |
| 4,153,345 | 5/1979 | Duchéne et al. | 359/297 |
| 4,331,386 | 5/1982 | Minami | 359/274 |
| 4,356,818 | 11/1982 | Macias et al. | 128/886 |
| 4,382,700 | 5/1983 | Youngren | 374/102 |
| 4,408,557 | 10/1983 | Bradley et al. | 116/206 |
| 4,418,129 | 11/1983 | Goebel | 429/91 |
| 4,561,729 | 12/1985 | Heinz et al. | 359/269 |
| 4,703,754 | 11/1987 | Ibbott | 128/383 |
| 4,804,275 | 2/1989 | Kang et al. | 374/162 |
| 4,876,441 | 10/1989 | Hara et al. | 235/488 |
| 4,977,046 | 12/1990 | Bleszinski, Jr. et al. | 429/194 |
| 5,035,965 | 7/1991 | Sangyoji et al. | 429/124 |
| 5,055,968 | 10/1991 | Nishi et al. | 361/395 |
| 5,197,958 | 3/1993 | Howell | 604/361 |
| 5,250,905 | 10/1993 | Kuo et al. | 324/435 |
| 5,264,830 | 11/1993 | Kline et al. | 340/604 |
| 5,339,024 | 8/1994 | Kuo et al. | 324/435 |
| 5,350,645 | 9/1994 | Lake et al. | 429/124 |
| 5,354,289 | 10/1994 | Mitchell et al. | 604/361 |
| 5,392,032 | 2/1995 | Kline et al. | 340/604 |
| 5,396,177 | 3/1995 | Kuo et al. | 324/435 |
| 5,418,086 | 5/1995 | Bailey | 429/93 |
| 5,500,759 | 3/1996 | Coleman | 359/270 |
| 5,516,598 | 5/1996 | Visco et al. | 429/42 |
| 5,523,179 | 6/1996 | Chu | 429/104 |
| 5,532,077 | 7/1996 | Chu | 429/102 |
| 5,582,623 | 12/1996 | Chu | 429/623.1 |
| 5,614,586 | 3/1997 | Tang et al. | 524/817 |
| 5,627,472 | 5/1997 | Ofer et al. | 324/435 |
| 5,789,100 | 8/1998 | Burroughs et al. | 429/93 |

FOREIGN PATENT DOCUMENTS

| | | |
|---|---|---|
| 0638952 | 2/1995 | European Pat. Off. . |
| WO 9306474 | 4/1993 | WIPO . |

*Primary Examiner*—Georgia Epps
*Assistant Examiner*—Evelyn A. Lester
*Attorney, Agent, or Firm*—Eugene Stephens & Associates

[57] ABSTRACT

Printed electrochemical display cells are arranged in layer form with two electrode layers and an electrolyte layer occupying distinct areas of a substrate. An electrolyte layer overlaps most of one electrode layer but contacts a smaller portion of the other electrode layer, which is made of a thin film. When activated, an electrochemical reaction progressively increases the area occupied by the electrolyte layer and progressively decreases the area occupied by the thin-film electrode layer. The thin-film electrode layer recedes at a boundary in common with the electrolyte layer and provides an irreversible indication of change at a rate governed by the electrochemical reaction.

68 Claims, 6 Drawing Sheets

ELECTROCHEMICAL DISPLAY AND TIMING MECHANISM WITH MIGRATING ELECTROLYTE

This application claims the benefit of U.S. Provisional Application No. 60/045,051, filed on Apr. 28, 1997, now abandoned, which provisional application is incorporated by reference herein.

TECHNICAL FIELD

The invention relates to progressively changing displays including such displays in which the progressive change is used to perform a timing function. In the displays contemplated by the invention, electrochemical reactions produce the progressive change; and these displays are preferably self-powered, irreversible, low cost, and formed in layers that can be printed on an in-line press.

BACKGROUND

Progressively changing displays can be used both to perform timing functions and to display the progress or results of the timing functions. Such displays that are arranged to mark the passage of time are particularly useful as attachments to products with a limited life, such as food, room deodorants, flea collars, roach traps, and other products whose usefulness or effectiveness decreases over time. The progressive changes in these displays can also be equated to the service lives of other products such as batteries or filters, where service life is determined more by usage.

Various mechanisms have been used to effect such progressive changes in displays including physical migration, chemical reactions, and electrochemical reactions. Among the latter are displays that include electrochromic materials and voltaic or electrolytic cells.

For example, U.S. Pat. No. 4,804,275 to Kang et al. discloses a self-powered electrochromic timing device in which a color change boundary in an electrochromic material is advanced by a gradual dissolution of an electrode. Kang et al.'s electrochromic reactions, however, require a strong acid and other materials that add cost and pose problems for both manufacture and use.

U.S. Pat. No. 5,339,024 to Kuo et al. discloses a self-powered charge indicator cell connected in parallel with a main cell. An anode layer carried on a conductive substrate of the indicator cell is gradually oxidized (i.e., eroded) to reveal a message written in ink on an underlying layer. The thickness of the anode layer is tapered or stepped to regulate its rate of disappearance. Another embodiment arranges the anode and cathode layers side-by-side and fashions the electrolyte layer as a porous film straddling both electrode layers. The anode layer erodes under the electrolyte film in a direction away from the cathode layer. Both of Kuo et al.'s embodiments are subject to "islanding", however, where portions of the anode layer become electronically isolated from the cathode layer and prevent the anode layer's more complete disappearance.

U.S. Pat. No. 5,418,086 to Bailey discloses an electrolytic type battery charge indicator powered by the monitored battery. One electrode layer is dissolved and redeposited on another electrode layer as an indication of battery usage. The rate of dissolution and redeposition is controlled by tapering or stepping electrolyte layer thickness between the electrode layers. Like in Kuo et al., the dissolving electrode layer is also subject to islanding, which limits further dissolution of the electrode layer. Another embodiment positions the two electrode layers side-by-side on a common substrate and fills a space between them with electrolyte. The exchanges between electrode layers are expected to grow increasingly irregular with variations in distance between them. Also, the electrolysis operations are at least partially reversible, which can be a problem if more permanent change is desired.

SUMMARY OF INVENTION

We have discovered that thin-film electrodes of electrochemical display cells can be more cleanly eroded for purposes of both measurement and display by linking the erosion of the thin-film electrodes to an expanding boundary of electrolyte. The erosion of the thin film is substantially complete and permanent behind the expanding boundary of electrolyte, and a clear demarcation is provided between the eroded and non-eroded portions of the thin film at the electrolyte boundary. For purposes of this invention and its further description, the term "erode" is regarded as synonymous with the terms "oxidize", "dissolve", "clear", and "disappear" as they pertain to the systematic removal of thin-film electrodes.

According to one expression of our invention, an electrochemical display cell is arranged as a voltaic cell with two electrode layers having different electrode potentials. An electrolyte layer overlaps a first of the electrode layers and has a boundary in contact with a second of the electrode layers for completing an ionically conductive pathway between the two electrode layers. In response to a flow of current between the two electrode layers, the electrolyte boundary moves together with a boundary of the second electrode layer extending the ionically conductive pathway from the first electrode layer. The moving boundary of the second electrode layer provides for changing a visible appearance of the display.

The second electrode layer recedes rapidly at first until the boundary of the electrolyte layer is reached and then the recession slows considerably but continues through the remaining portion of the second electrode layer that was not initially in contact with the electrolyte layer. This surprising result is produced by an accompanying migration of the electrolyte that is apparently drawn along with the receding boundary of the second electrode layer by the interplay of one or more such mechanisms as capillary action, surface tension, diffusion, or electric field effects on ions of the electrolyte layer. More complete clearing of the second electrode layer takes place because erosion is limited to an interface formed by contiguous moving boundaries of the second electrode and electrolyte layers.

The second electrode layer is preferably a thin film capable of undergoing an electrochemical reaction that results in the progressive disappearance of the second electrode layer behind the moving boundary of the electrolyte layer. For example, the second electrode can be made of a thin film of aluminum deposited onto a transparent substrate, which provides a viewing window for observing the orderly disappearance of the thin film. The transparent substrate is preferably not conductive to avoid interfering with ion migration between the electrode layers across the portion of its surface exposed by the disappearing thin film.

Another expression of our invention features an electrochemical cell that has two electrode layers and an electrolyte layer occupying distinct areas of a substrate. The electrolyte layer is in contact with the two electrode layers for completing an ionically conductive pathway between them. An electronically conductive pathway between the electrode layers supports an electrochemical reaction that progressively increases the area of the substrate occupied by the electrolyte layer and progressively decreases the area of the substrate occupied by one of the electrode layers. The progressively increasing area of the electrolyte layer and the progressively decreasing area of the one electrode layer provide an irreversible indication of change at a rate governed by the electrochemical reaction.

Preferably, the progressively increasing area of the electrolyte layer corresponds to the progressively decreasing area of the one electrode layer. The area of the substrate occupied by the other electrode preferably remains substantially constant throughout the electrochemical reaction.

Though spatially and electronically separated, the first and second electrodes can have an irregular-shaped interface prior to the start of erosion. The irregular-shaped interface, such as a saw-tooth pattern, appears to enhance the electrochemical interaction between the electrode layers. Also, the second electrode layer is preferably funnel-shaped with its wide end adjacent to the first electrode layer to further increase the length of the irregular-shaped interface and to promote the migration of electrolyte in the direction of its advancing boundary. The narrow end of the second electrode layer is elongated to channel the erosion at a faster pace along a predetermined pathway.

The pace of erosion of the second electrode layer can be further influenced in a variety of ways. In addition to adjusting the materials, shapes, and sizes of the electrode layers, the pace of erosion can be influenced by adjusting similar properties of the electrolyte layer, especially the viscosity and ionic conductivity of the electrolyte layer. For example, the electrolyte layer can be made from an electrolytic gel to relatively advance the pace of erosion or from an electrolytic adhesive to relatively retard the pace of erosion. Properties (e.g., resistance) of the electrical connection between electrode layers can also be adjusted to control the pace of erosion.

A printed layer on the substrate can have a window aligned with a limited portion of the length of the second electrode layer for observing movement of an interface between the electrolyte and second electrode layers. Visual images ranging from a patch of color to text or graphics can be progressively revealed behind the second electrode to enhance appearance (such as creating a "fuel gauge" effect) or to provide information related to the progress of the moving interface.

Our electrochemical display cell can be constructed as either a voltaic cell, an electrolytic cell, or a hybrid cell containing elements of both. For example, the two electrodes can be made of different conductive materials that generate an electrical potential between them for making a voltaic display cell. The power required to remove the thin metal film is provided by spontaneous redox reactions within the cell. The two electrodes can also be made of the same material (i.e., the material of the thin metal film anode), and an external source of electrical power drives similar redox reactions within the cell. A hybrid display cell can be constructed by sharing electrodes between voltaic and electrolytic portions of a combined cell. The voltaic portion provides the power for removing portions of the thin metal film within the electrolytic portion of the display.

The anode thin metal film is preferably a sputtered or metalized aluminum that is deposited onto a transparent substrate such as PET (polyethylene terephtalate) or Mylar polyester. Thin films of aluminum of approximately 30–500 Angstroms thick can perform sufficiently well as anodes to support their orderly disappearance.

The cathode is preferably a conductive carbon layer printed onto a dielectric layer or substrate or it can be a second metallic thin film such as silver, either of which produces a potential difference with respect to the anode. The cathode can also be made of a manganese dioxide layer printed over a carbon layer that acts as the current collector for carrying current back to the anode along an electronically conductive pathway.

The electrolyte can be in the form of a gel that is held in place by a suitably shaped dielectric spacer; or in a preferred embodiment, an electrolytic salt, for example, can be mixed into an adhesive, including a pressure-sensitive, UV-curable adhesive or an animal glue. The resulting electrolytic adhesive can act as a binder for the overall structure of the display cell as well as a spacer between the anode and cathode electrode layers.

Our new display cell is well suited for manufacture along an in-line press, especially in label form. All of the layers including the electrodes, the electrolyte, the electronic conductor, the printed images, and an adhesive-backed substrate in label form can be combined from individual webs or printed along the webs. The result is a succession of thin flexible displays that can be manufactured at low cost and integrated with other printable products. Also, the displays consume little power and are irreversible, which are both particularly useful features for such products as service life and elapsed time indicators.

DRAWINGS

DETAILED DESCRIPTION

Figure 1:
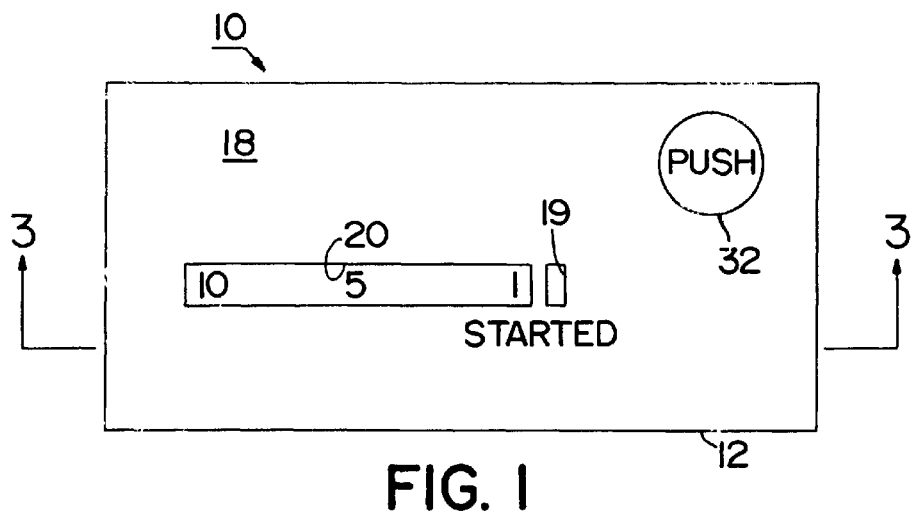
FIG. 1 is a plan view of a voltaic display cell arranged for revealing a systematically changing visual image behind a receding thin-film boundary.
Figure 2A:
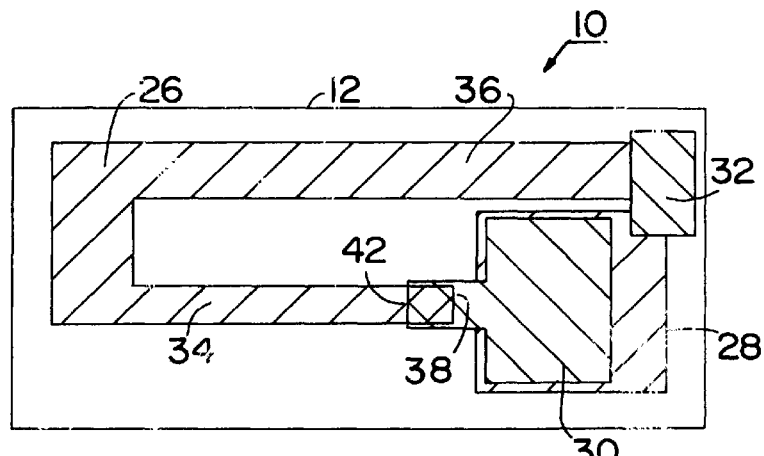
FIG. 2A is a bottom view of the voltaic display cell with a bottom substrate removed to show the active electrochemical components of the cell as they appear prior to activation.
Figure 2B:
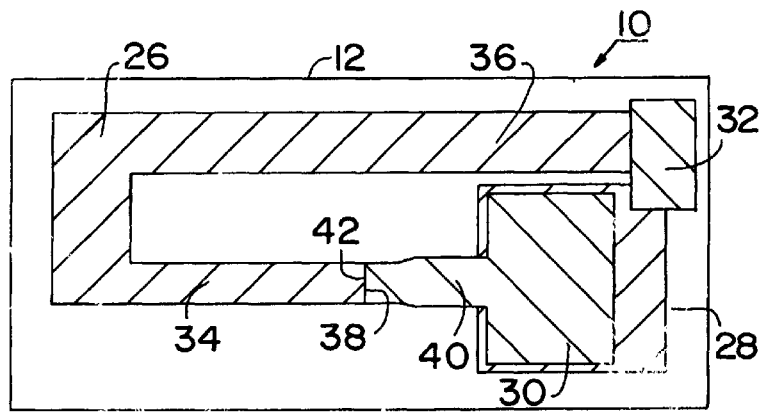
FIG. 2B is a similar bottom view of the cell showing the electrochemical components as they would appear some time after the cell has been activated.
Figure 3:
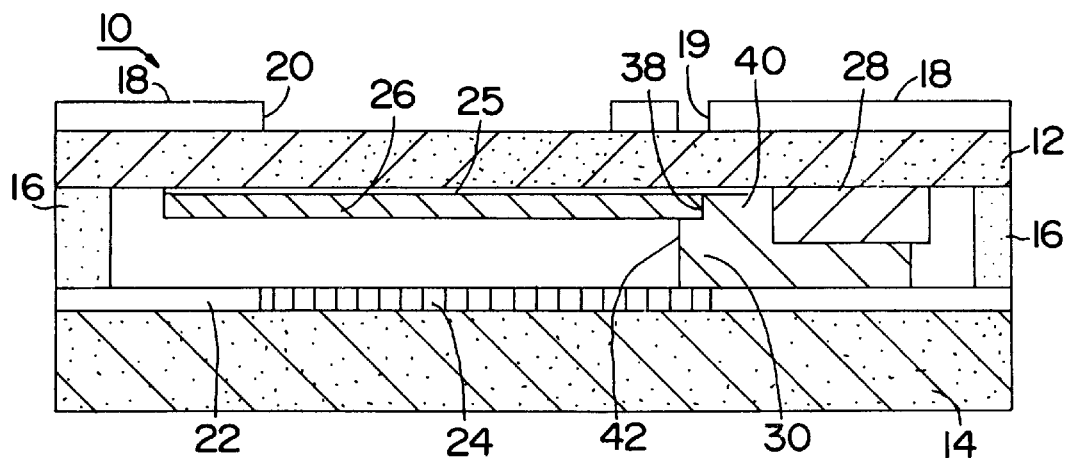
FIG. 3 is a cross-sectional view of the voltaic display cell taken along line 3—3 of FIG. 1.

A voltaic display cell 10 depicted by FIGS. 1–3, which is particularly suited for timing functions, includes top and bottom substrates 12 and 14 bonded together by a dielectric adhesive 16. A graphics layer 18 covers the top substrate 12, which is preferably otherwise transparent, in a pattern that leaves a window 20 for viewing through the top substrate 12. A graphics layer 22 on the bottom substrate 14 includes a visible image 24 that is aligned with the window 20. The visible image 24 can be a pattern of color, text, or graphics.

Sealed between the top and bottom substrates 12 and 14 are two planar electrode layers 26 and 28 interconnected by both an ionically conductive pathway formed by electrolyte layer 30 and an electronically conductive pathway formed by a button switch 32. The button switch 32 opens or closes a complete electrical circuit that extends through both electrode layers 26 and 28 and the electrolyte layer 30. Both substrates 12 and 14 are not conductive to prevent shorting and to avoid interfering with ion migration between the two electrode layers 26 and 28.

The two electrode layers 26 and 28 are made of different materials for generating an electrochemical potential difference. The electrode layer 26 is preferably a thin film of sputtered or vapor-deposited metal, such as aluminum, bonded by its manufacturing technique to a thin Mylar polyester film 25. The electrode layer 28 is a different metal such as manganese dioxide backed by a carbon conductor or a layer of conductive carbon alone, either in a form that can be laid down by printing. A thin film of sputtered or vapor deposited metal, such as silver, could also be used to form the electrode layer 28. Although not shown, a conductive backing for the electrode layer 28, such as printed carbon, can be provided as a current collector if necessary. The electrolyte layer 30, which can also be printed in the form of a paste, gel, or a pressure-sensitive adhesive, can be selected from a wide variety of ionic conductors to support the flow of charge between the electrode layers 26 and 28.

The two electrode layers 26 and 28 and the electrolyte layer 30 occupy distinct areas of the supporting substrates 12 and 14. The electrode layer 26 has a U-shape with separate arms 34 and 36 for facilitating separate ionic and electronic connections to the electrode layer 28. The electrolyte layer 30 is laid down in a pattern that covers most of the electrode layer 28 but only marginally overlaps the arm 34 of the electrode layer 26, just covering its initial boundary 38. The switch 32 electronically interconnects the electrode layer 28 with the other arm 36 of the electrode layer 26. A conductive layer, such as carbon, could be applied to the electrode arm 36 to increase its durability, especially in the region of switch contact.

Figure 4:
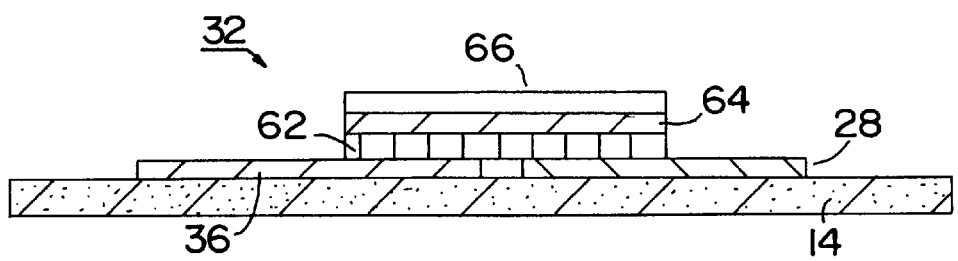
FIG. 4 is a partial cross-sectional view of the same cell showing layers of a switch interconnecting two electrode layers.

A schematic view of the switch 32 is shown in FIG. 4 in which the electronic contact between the electrode arm 36 of the electrode layer 26 and the electrode layer 28 is made by means of a conductive tape 62 laminated onto a strip of thin metallic film 64, such as copper or aluminum, and overlaid by a graphics layer 66 indicating how the user is to place the switch to activate the display cell 10. An example of the conductive tape 62 is 3M product number 9703. The referenced tape 62 is conductive normal to its plane of lamination; and the metallic film 64, which is in contact with the tape 62, carries current parallel through this plane for bridging the gap between the electrode layers 26 and 28.

When the switch 32 is closed, a spontaneous oxidation-reduction reaction (i.e., a redox reaction) takes place within the voltaic display cell 10 resulting in the flow of current between the electrode layers 26 and 28. The movement of charge between the electrode layers 26 and 28 produces erosion of the (thin film) electrode layer 26 starting at its closest boundary 38 in ionic communication with the electrode layer 28. At first, the boundary 38 recedes rapidly through the portion of the electrode layer 26 covered by the electrolyte layer 30 and then slows considerably but continues to recede through the remaining portion of the electrode layer 26 that was not initially covered with the electrolyte layer 30.

Although the mechanism by which the electrolyte layer 30 migrates to continue the recession of the electrode layer 26 is not completely understood, a boundary 42 of the electrolyte layer 30 is apparently drawn along with the receding boundary 38 of the electrode layer 26, thereby maintaining the flow of charge between the electrode layers 26 and 28. More complete clearing of the electrode layer 26 takes place because the erosion is limited to an interface formed by the contiguous moving boundaries 38 and 42 of the electrode layer 26 and the electrolyte layer 30.

By shaping the graphics layer 18 to place a window 19 over the region of initial overlap between the electrolyte 30 and the first electrode 26, an immediate indication that the display has been activated will be obtained when the electrode layer 26 erodes in the area 40 to reveal graphics or color printed on the graphics layer 24. The window 20 in the graphics layer 18 reveals the results of the slower erosion of the remaining portion of the electrode layer 26. The erosion results could also be viewed intermittently by dividing the window 20 into a series of smaller spaced-apart windows, each revealing a separate part of the electrode layer 26.

The further recession of the boundary 38 of the electrode layer 26 together with the corresponding advancement of the boundary 42 of the electrolyte layer 30, which is depicted in FIG. 2B, takes place along the electrode arm 34, which has been narrowed to significantly increase the rate of the boundaries' coincident movements. In addition to the boundaries' common width, the amount of charge flowing across the boundaries 38 and 42 also affects the common rate of the boundaries' movements. Factors relating to the amount of charge flowing across the boundaries 38 and 42 include the areas of the two electrode layers 26 and 28, the amount and makeup of the electrolyte layer 30, the resistance of the electronically conductive pathway (e.g., the switch 32), and the thickness of the electrode layer 26. Also, the common rate of the boundaries' movements is inversely related to the spacing between the common portions of the boundaries 38 and 42 and the electrode layer 28, which corresponds to the path length of ion migration between the electrode layers 26 and 28. Accordingly, the pace of the boundaries' movements slows with time as both the area of the electrode layer 26 decreases and the spacing between the electrode layers 26 and 28 increases.

Preferably, the thin film is less than 400 Angstroms thick, with thickness less than 200 Angstroms being more preferred. However, the thin film should be thick enough to block a view of the visual image 24 through the window 20. Uniformity of the thin film is also important to avoid irregular erosion that could leave islands that are electronically isolated from the remaining portions of the electrode 26.

The electrolyte 30 is preferably an electrolytic adhesive to retain its desired pattern without further confinement and to bond the two substrates 12 and 14 together. For example, U.S. Pat. No. 5,614,586 to Tang et al., which is hereby incorporated by reference, discloses a hydrogel adhesive suitable for conveying charge between the two electrodes 26 and 28.

Figure 5:
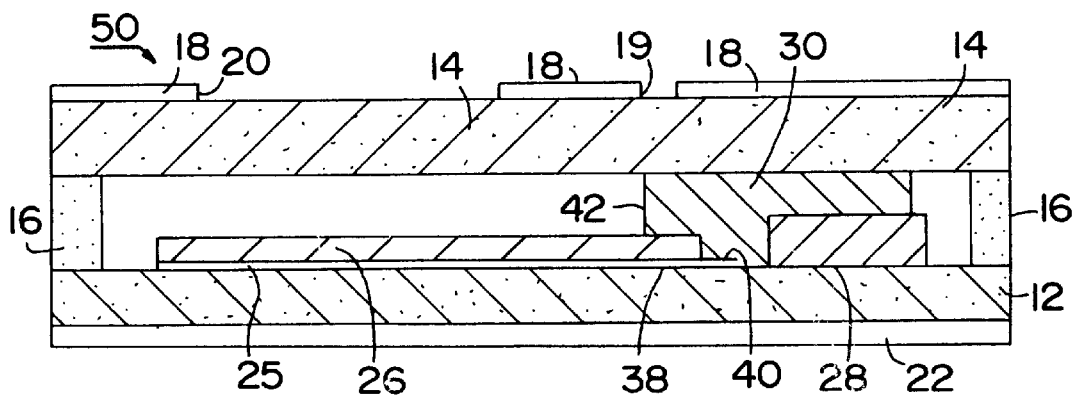
FIG. 5 is a cross-sectional view of a similar voltaic display cell modified to depict an alternative viewing option having an opposite line of sight through the display.

FIG. 5 depicts an alternative embodiment to the display cell 10 in which the structure of the new display cell 50 is essentially inverted between the outer layers 12 and 14. Similar reference numerals call out similar elements of the cells 10 and 50 to more clearly contrast the reordering among the elements. In both embodiments 10 and 50, the receding boundary 38 of the eroding electrode layer 26 is viewed through the window 20.

Instead of patterning the electrode layer 26, the thin film of the electrode layer 26 together with its film backing 25 could be enlarged and substituted for one of the substrates 12 or 14. A patterned dielectric coating could be applied to isolate the nonfunctional areas of the thin film from electrical contact with other active components of the display cell 10. The total area of the thin-film electrode layer 26 would increase sharply, but its area in contact with the electrolyte layer 30 would remain the same. Care should be taken to pattern the electrolyte layer 30 within the exposed area of the thin film to avoid creating pathways for ion conduction to the other electrode layer 28 circumventing the intended boundary 38 of the thin film. Also, either the thin-film electrode or the dielectric coating could be patterned, together with the electrolyte, to provide more than one boundary for erosion (e.g., additional electrode arms) or to provide electrode arms with nonlinear shapes.

The display cell 10 can be used for a variety of purposes as a stand-alone device or as a display component of another device. For example, the display cell 10 can be used as a game piece, a message card, an elapsed time indicator, or as an indicator related to some internal or external condition. Layers of adhesive and release can also be added to the substrates to incorporate the displays into pressure-sensitive labels or other printable products. The receding boundary 38 can also be used as a gauge equating some ongoing condition to the flow of charge through the cell. The rate of erosion can be further controlled by regulating the current that is allowed to flow through the self-powered display cell. This can be done by placing an optional printed resistor (not shown) of known resistance in the circuit of this or any of the other display cells described here.

Figure 6:
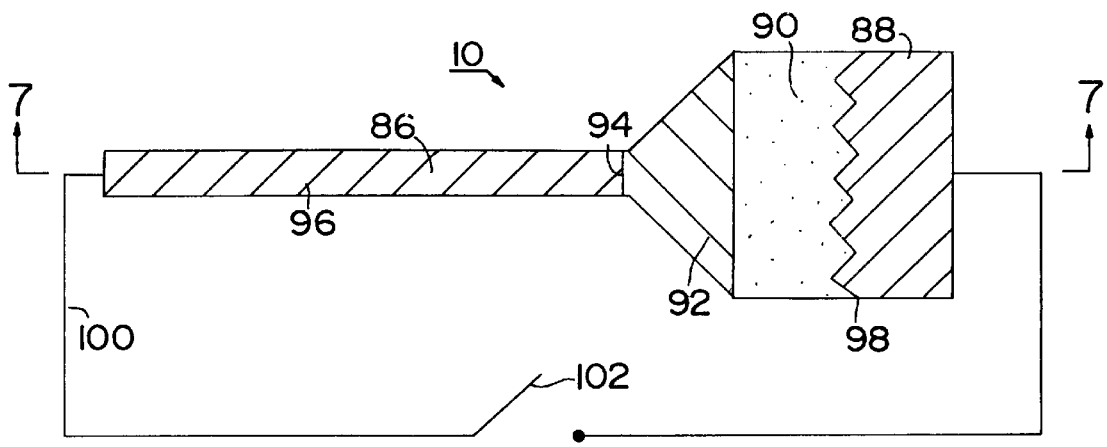
FIG. 6 is a top view of two electrode components of an alternative display cell shaped to enhance boundary erosion of one of the electrodes.
Figure 7:
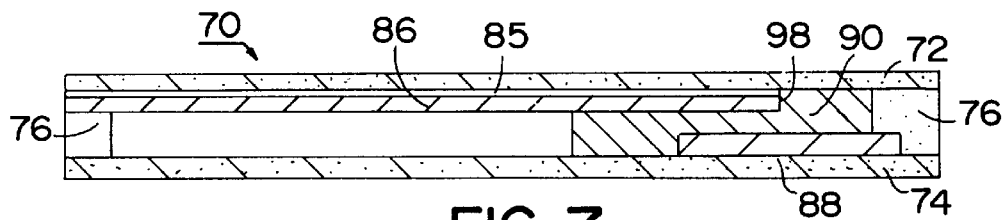
FIG. 7 is a cross-sectional view showing additional layers of the alternative display cell and taken along line 7—7 of FIG. 6.

FIGS. 6 and 7 illustrate an alternative display cell 70, which is made of similar materials and is useful for similar purposes but is specially configured to aid the migration of electrolyte. Top and bottom substrates 72 and 74 are peripherally bonded by a dielectric adhesive 76 and seal between them the active components of an electrochemical cell. A thin-film electrode layer 86 is mounted on the substrate 72 through the intermediacy of a clear film backing 85, and another electrode layer 88 is mounted on the substrate 74. The two electrode layers 86 and 88 preferably have different electrode potentials, but an electrical potential could also be imposed across them by a separate source of electrical current. In the cell shown, an electrical conductor 100 and a switch 102 complete an electronically conductive pathway between the electrode layers 86 and 88.

An electrolyte layer 90 overlaps most of the electrode layer 88 and a first portion 92 of the electrode layer 86 for completing an ionically conductive pathway between the electrode layers 86 and 88. A boundary 94 of the electrolyte layer 90 separates the first portion 92 of the electrode layer 86 from a second portion 96 that is not overlapped by the electrolyte layer 90. The first portion 92 of the electrode layer 86 is funnel-shaped with a wide end 98 cut in a saw-tooth pattern. The electrode layer 90 matches the funnel shape of the electrode layer 86 and overlaps the saw-tooth interface with the electrode layer 88.

Both the irregular shape and the width of the end 98 of the electrode layer 86 increase the length of "shoreline" (i.e., lateral interface) between the electrode layers 86 and 88. This appears to allow an enhanced flow of charge between the two electrode layers 86 and 88. After erosion of the first portion 92 of the electrode layer 86 from its thin-film backing 85, the remaining funnel shapes of the backing 85 and the electrolyte layer 90 appear to enhance the migration of the electrolyte layer 90 toward its common boundary 94 with the remaining second portion 96 of the electrode layer 86. Further electrolyte migration and electrode erosion take place along the common boundary 94 at a pace that is further enhanced by the narrow width of the second portion 96 of the electrode layer 86.

Graphic layers, which are not shown, can be added to the various substrates similar to the previously described display cells. An adhesive backing and release layers can also be added for incorporating the display cells into labels or other packaging structures.

Figure 8:
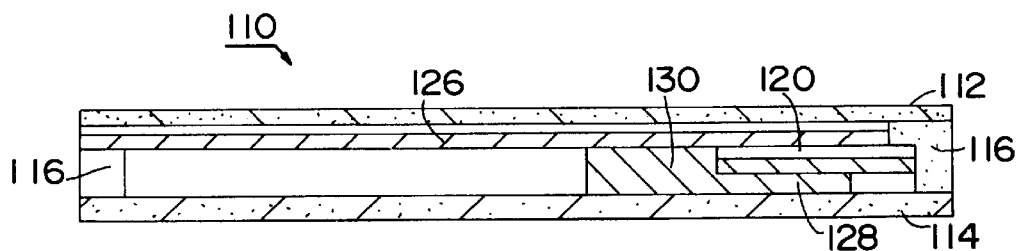
FIG. 8 is a cross-sectional view of a display cell similar to the display cell in FIGS. 6 and 7 but having active layers arranged in a different order.

Another display cell 110 having a similar funnel-shaped electrode configuration is shown in FIG. 8. Again, two substrates 112 and 114 and a dielectric adhesive 116 enclose the active components of the cell. However, both electrode layers 126 and 128 are mounted on the same substrate 112 and separated by a dielectric layer 120 that electronically isolates the two electrode layers 126 and 128. An electrolyte layer 130 overlaps portions of both of the electrode layers 126 and 128. The electrode layer 128 preferably includes a saw-tooth pattern to increase the length of its lateral interface with the electrode layer 126. Though not shown, the two electrode layers 126 and 128 could be laid out entirely side-by-side on the same substrate with a mating saw-tooth or other complementary shaped interface.

Alternatively, the electrode layers 126 and 128 could be laid out in an arrangement where the electrode layer 128 overlaps the portion of the electrode layer 126 that is subject to systematic erosion. A receding boundary of the electrode layer 126 and an advancing boundary of the electrolyte layer 130 would move together within a space between the dielectric layer 120 and the underlying transparent support for the thin film of the electrode layer 126. A graphics layer could be added within a space between the two electrode layers 128 and 128, preferably between the dielectric layer 130 and the electrode layer 128, to provide a visual image that is gradually revealed by the systematic erosion of the electrode layer 126.

Figure 9:
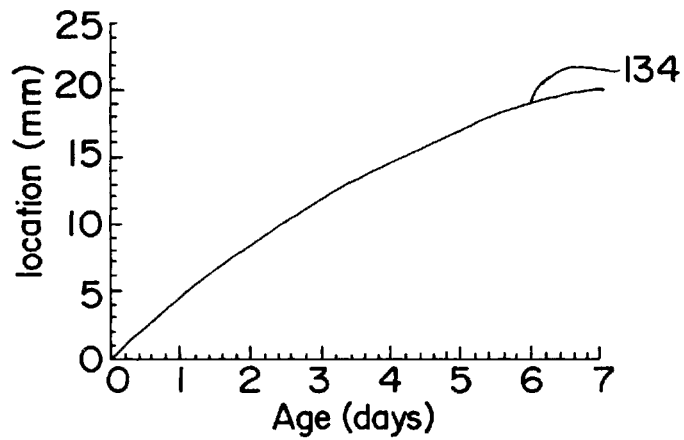
FIG. 9 is a graph relating distance of recession to the passage of time for display cells similar to those of FIGS. 6 and 7.

A graph in FIG. 9 plots the recession of a common electrode-electrolyte boundary against time for a display cell similar to those described above. A curve 134 constructed from exemplary data points follows a power law shape. A combination of factors may be responsible for a slowing of the pace of boundary migration with time, but at least one of these factors is expected to relate to an increasing internal resistance of the cells. Exhaustion of the supply of electrolyte is also expected to limit its range of migration. A large reservoir of electrolyte in contact with the stationary electrode can be used to extend the range of migration.

Figure 10:
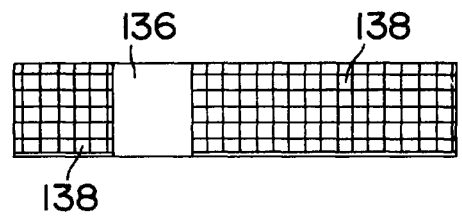
FIG. 10 shows an alternative window for viewing a segment of the receding electrode.

FIG. 10 shows an alternative window 136 in a top substrate (e.g., 12, 72, or 112) of one of the previous display cells, where most of the length of the erodable electrode (26, 86, or 126) is covered by masking 138 except for the window 136. Accordingly, much of the boundary migration remains unseen until the boundary (e.g., 38 or 98) recedes into a region visible through the window 136. The location of the window 136 can be used to provide a timing function or other form of indication related to the cumulative amount of charge passing through the cells.

Figure 11:
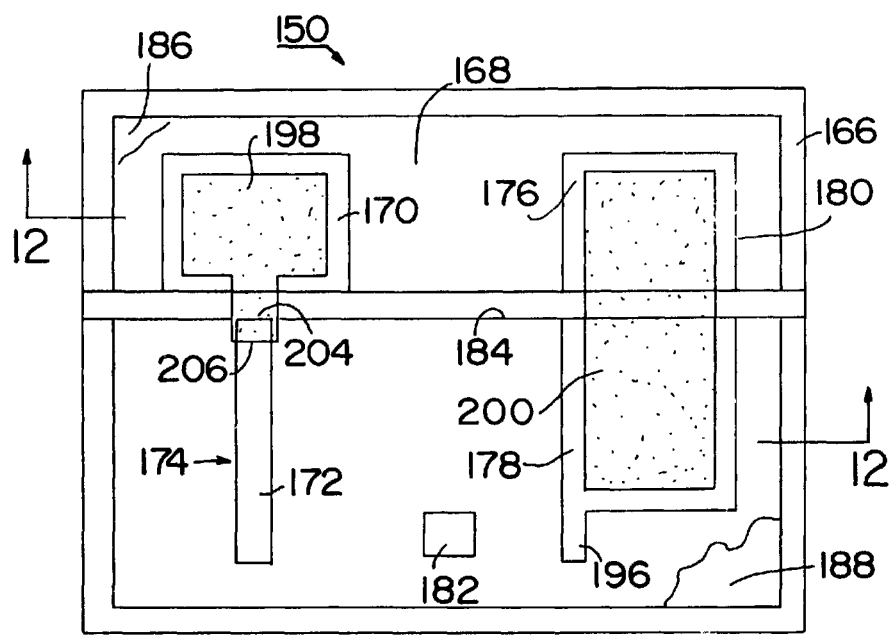
FIG. 11 is a partly broken away bottom view of a hybrid display cell with a bottom layer removed to show features of a voltaic power cell combined with an electrolytic display cell.
Figure 12:
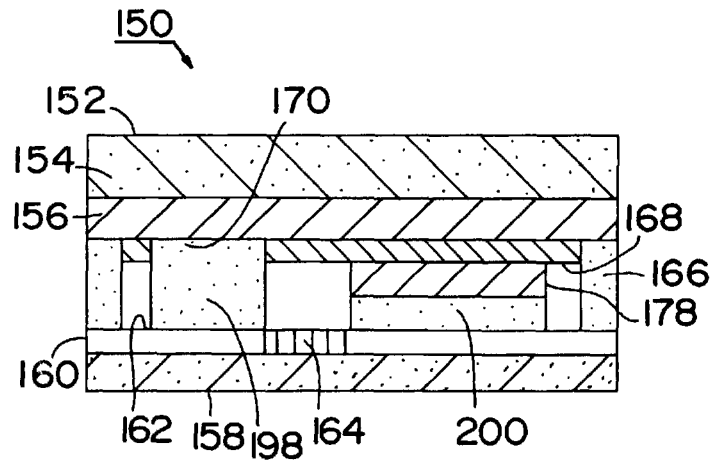
FIG. 12 is a cross-sectional view of the hybrid display cell taken along line 12—12 in FIG. 11.

A hybrid display cell 150 depicted in FIGS. 11 and 12 combines features from both voltaic and electrolytic cells. A top substrate 152 is a transparent film 154 covered by a layer of thin metal film 156 (again, preferably sputtered aluminum). A bottom substrate 158 is a print medium 160 covered by a graphics layer 162. A portion of the graphics layer 162 includes a visible image 164, which can be nothing more than a pattern of color to provide contrast or can be specific text or graphics. A dielectric adhesive 166 bonds peripheries of the top and bottom substrates 152 and 158.

Another dielectric 168 (preferably in the form of a varnish) covers portions of the thin film 156 defining, within separately exposed areas of the thin film 156, two electrodes 170 and 172 of an electrolytic cell 174 and one electrode 176 of a voltaic cell 180, as well as a switch contact 182. A second electrode 178 of the voltaic cell 180 is printed over a portion of the dielectric 168. The second electrode 178 is a different material, such as manganese dioxide, for providing an electrochemical potential difference with the electrode 176. A collector beneath the electrode 178 is preferred but not shown.

A gap 184 divides the thin film 156 into two portions 186 and 188 for electronically isolating the two electrodes 170 and 172 of the electrolytic cell 174 and the two electrodes 176 and 178 of the voltaic cell 180. Remaining areas of the two portions 186 and 188, which are covered by the dielectric 168, provide conductive pathways between the two cells 174 and 180. The remaining area of thin-film portion 186 connects the electrodes 170 and 176 directly. However, the conductive pathway between the electrodes 172 and 178 provided by the remaining area of the thin-film portion 188 is interrupted by a switch (not shown), which spans the contact 182 of the thin-film portion 188 and a contact 196 of the electrode 178.

Separate electrolyte patterns 198 and 200 span the electrodes 170 and 172 of the electrolytic cell 174 and the electrodes 176 and 178 of the voltaic cell 180. The electrolyte pattern 198 overlaps a large portion of the electrode 170 but contacts only a small portion of the narrower electrode 172 along which electrolyte migration is supported.

Closing the switch between the contacts 182 and 196 completes a circuit between the two cells 174 and 180. Spontaneous redox reactions in the voltaic cell 180 create a potential difference across the two portions 186 and 188 of the thin metal film 156, which induces other redox reactions in the electrolytic cell 174. Accompanying the flow of charge through the electrolytic cell 174, a boundary 204 of the electrode 172 quickly recedes until it meets a boundary 206 of the electrolyte; and thereafter, the two boundaries 204 and 206 move together at a slower pace through an increasing distance from the electrode 170. More irregular erosion can also occur in the electrode 176 of the voltaic cell 180.

However, the electrode 176 is sized so that the visual image 164 is revealed before the voltaic cell 180 expires.

Except for the disappearing electrode 172, the other two electrodes 170 and 176 that are exposed by the dielectric 168 can be overprinted with conductive materials including the same material as the thin film 156 (e.g., aluminum) to limit their erosion or to enhance their electrochemical properties. The electrode 176, for example, can be entirely overprinted with another electrode material, such as zinc, to provide more energy for powering the redox reactions of the electrolytic cell 174.

The electrolytic cell portion 174 of the hybrid display cell 150 could also be modified to erode more than one area of the electrode 172. The two electrodes 176 and 178 could also be stacked together in a more conventional form, since neither electrode 176 and 178 is eroded for display purposes. Similar benefits to those obtained from this hybrid display cell 150 can be obtained from compound voltaic cells. Two separate electrolyte layers bridge electrode layers with different electrode potentials. A first of the electrolyte layers provides the intended pathway for systematic erosion of one of the electrode layers, and a second of the electrolyte layers separately bridges the two electrode layers to provide a more constant source of power as the migration proceeds. At least three separate electrodes are preferred, only one of which is a thin film subject to rapid disappearance. Both of the electrode portions bridged by the second electrolyte layer are preferably more robust.

Figure 13:
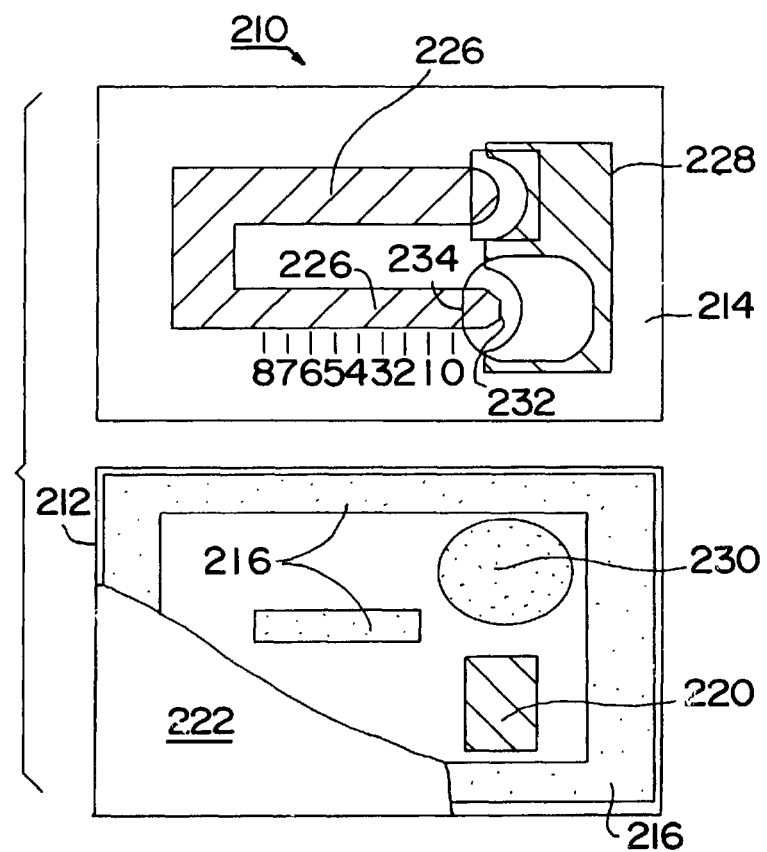
FIG. 13 shows two halves of a deferred assembly display cell having active components divided between two substrates to prolong shelf life prior to use.

FIG. 13 illustrates another simple voltaic display cell 210 with similar features but modified for deferred assembly to extend shelf life of the cells by reducing possibilities for self-discharge until the cell is actually put into use (i.e., activated). Of the active electrochemical components, two electrode layers 226 and 228 are mounted (e.g., printed) on a bottom substrate 214, and an electronically conductive layer 220 and an electrolyte layer 230 are mounted (e.g., printed) on a top substrate 212. A dielectric adhesive layer 216 is also mounted (e.g., printed) on the top substrate 212 for eventually bonding the two substrates 212 and 214 together. A release liner 222, which is shown in a broken-away view to reveal underlying layers, covers and protects the electronically conductive layer 220, the electrolyte layer 230, and the dielectric adhesive layer 216 until ready for further assembly.

The two substrates 212 and 214 along with their accompanying layers can be stored in this condition with less risk of self-discharge for an extended period of time. When ready for use, the release liner 222 is peeled away, and the top and bottom substrates 212 and 214 are folded together so that the electronically conductive layer 220 and the electrolyte layer 230 operatively interconnect separate portions of the two electrode layers 226 and 228. The completed electronic and ionic pathways between the electrode layers 226 and 228 support an electrochemical reaction that erodes a boundary 232 of the electrode layer 226 up to a boundary 234 of the electrolyte layer 230 at a relatively fast pace; and thereafter, the boundaries 232 and 234 move together for eroding remaining portions of the electrode layer 226 at a slower pace.

Instead of printing the electrically conductive layer 222 on the top substrate 212, the two electrode layers 226 and 228 could be permanently electronically interconnected on the bottom substrate 214. Only the electrolyte layer 230 needs to remain out of contact with at least one of the electrodes 226 and 228 (preferably the thin-film electrode 226) to reduce the risk of self-discharge. Alternatively, the electronically conductive layer 220 could be replaced by a switch, which can be closed some time after assembly to further control the activation of the display cell 210.

Figure 14:
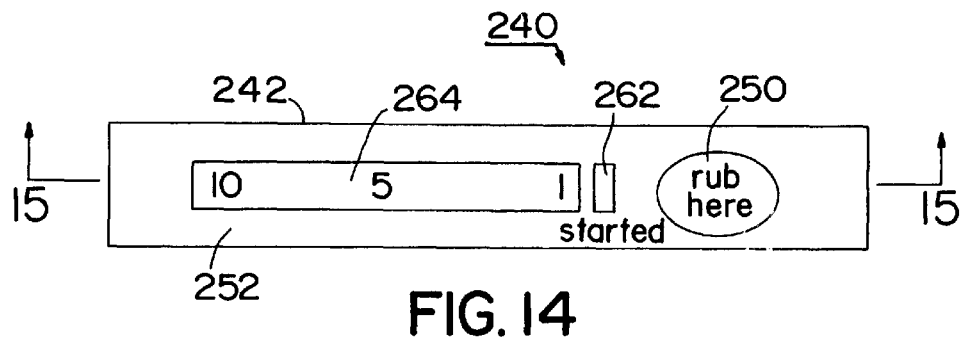
FIG. 14 is a plan view of a display cell similar to those of FIGS. 1–8 but arranged for deferred activation by temporarily isolating the electrolyte layer from one of the electrode layers.
Figure 15:
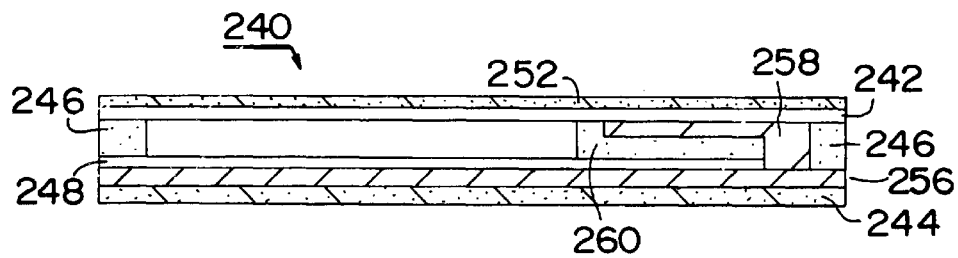
FIG. 15 is a cross-section of the deferred activation display cell taken along line 15—15 of FIG. 14.

FIGS. 14 and 15 illustrate a display cell 240, which is also expected to enjoy an extended shelf life by interrupting an electrolytic connection between two electrode layers 256 and 258. Similar to earlier embodiments, the two electrode layers are sealed between top and bottom substrates 242 and 244 that are bonded together by a dielectric adhesive layer 246. However, contrary to the earlier embodiments, the two electrode layers 256 and 258 are mounted in direct contact with each other forming a permanent electronic connection between them. An electrolyte layer 260 directly contacts the electrode layer 258 but is initially isolated from the electrode layer 256 by a passivation layer 248 containing a fragile dielectric material that prevents the electrolyte layer 260 from coming into contact with electrode layer 256 until a user wishes to activate the cell. Activation is accomplished as directed at a spot 250 of a graphics layer 252 by aggressive rubbing that breaks some of the fragile structure of the passivation layer 248 allowing the electrolyte layer 260 to penetrate the passivation layer 248 and contact the electrode layer 256. A window 262 in the graphics layer 252 reveals that the display cell 240 has been activated, and subsequent erosion of the electrode layer 256 becomes visible through another window 264 to reveal a color bar or a series of numbers (in this illustration) or other graphics.

Activation can also be deferred by passifying the electrolyte layer itself. For example, the electrolyte layer 260 can be arranged in direct contact with both of the electrode layers 256 and 258 but stored at temperatures below freezing, which can reduce the electrolytic action to near zero. Only when the electrolyte is thawed will the display cell 240 begin to activate. Such a display cell could be used to record and display an amount of time that a product has been exposed to temperatures above freezing.

Figure 16:
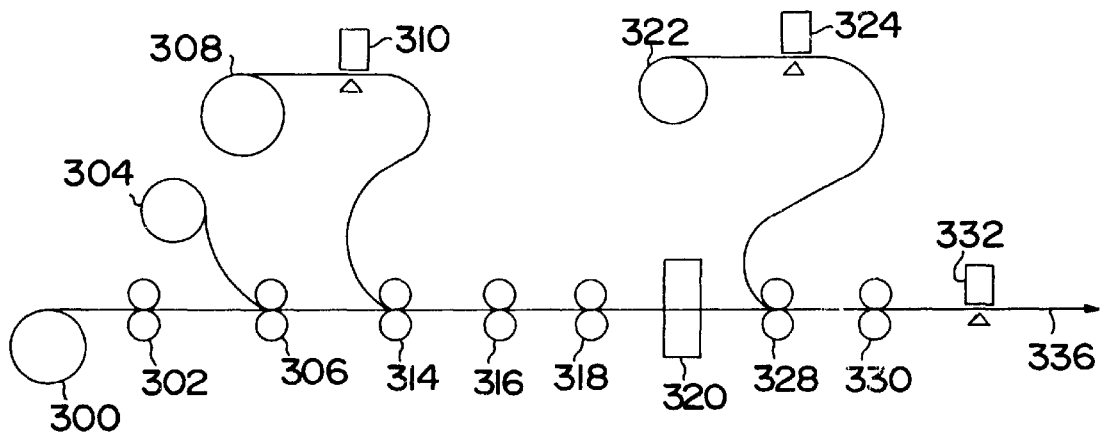
FIG. 16 is a schematic diagram of an in-line printing system for manufacture of a succession of display cells in label form.

Any of the display cells described here can be manufactured on an in-line press as illustrated in FIG. 16. A roll of pressure sensitive stock 300 with a release liner is unwound to serve as the base graphics layer printed at a printing station 302. A clear substrate 304 is unwound and laminated onto the base stock 300 at station 306. A roll of aluminum film 308 with a pressure-sensitive backing is die cut at station 310 and then laminated onto the clear base laminate at station 314. Another electrode is pattern printed at station 316, electrolyte is applied at station 318, and the electrolyte is cured or chilled at station 320. A pressure-sensitive top-sheet 322 on which adhesive has been zone coated is unrolled, die cut at station 324, and laminated onto the base layer at station 328. Further graphics are printed at station 330, the final shape of the display cells is die cut at station 332, and a succession of display cells in label form emerge at 336.

The thin metal films arranged as disappearing electrode layers in the preceding embodiments are all preferably formed by deposition onto non-conductive substrates and are distinguished from metal foils that are thinned from thicker metal forms. Deposition methods include vacuum evaporation, cathode sputtering, electroplating, and various chemical reactions in a controlled atmosphere or electrolyte. The deposited metal for the anode electrode is preferably aluminum; but other metals could also be used, such as copper, zinc, silver, or gold. The deposited material for the cathode electrode is preferably carbon, but thin films such as silver can also be used in combination with the aluminum film anode.

The display cells can be switched from a first state in which the thin metal film of the anode is opaque to a second state in which a predetermined area of the thin metal film becomes substantially transparent, but the display cells cannot be restored to the first state. The erosion that takes place in the thin metal films to reveal visual images is irreversible. The visual images remain permanently displayed through transparent portions of the non-conductive substrates that support the thin metal films.

All of the substrates, including the substrate that normally supports the thin metal film, the substrate that normally supports the visual image, and the pressure-sensitive adhesive-backed label stock are preferably supplied in rolls that can be unwound into an in-line press. All of the other layers, including the electrodes, the electrolyte, the dielectric, and the adhesives as well as the visual image, are preferably printed in patterns on one of the substrates by printing stations that are arranged along the press. Flexographic printing is preferred, but screen printing or other extrusion techniques may be required for printing the adhesives.

The thin metal films are preferably predeposited onto the top substrates in advance of any press operations. However, a thin metal film could also be transfer printed from a temporary carrier to the top substrate along the press, such as by hot or cold stamping. For example, a thin metal film could be transferred from the temporary carrier by cold stamping in a pattern that matches an adhesive pattern on the new substrate for shaping the electrodes.

Such in-line processing can be used to produce successions of electrochemical display cells in large volumes at low cost. Additional stations, such as die cutters, can be used to separate succeeding displays and to adapt the displays for their intended use as stand-alone display cells or as display cells incorporated within other products.

We claim:

1. An electrochemical display comprising:

first and second electrode layers having different electrode potentials;

an electrolyte layer overlapping said first electrode layer and forming a boundary with said second electrode layer for completing an ionically conductive pathway between said first and second electrode layers; and said electrolyte boundary being movable together with a boundary of said second electrode layer extending the ionically conductive pathway from said first electrode layer in response to a flow of current between said first and second electrode layers for changing a visible appearance of the display.

2. The display of claim 1 in which said second electrode layer is made of a thin film capable of undergoing an electrochemical reaction that results in the progressive disappearance of said second electrode layer behind said moving boundary of the electrolyte layer.

3. The display of claim 2 in which said second electrode layer is made of a thin metal film deposited onto a transparent substrate.

4. The display of claim 2 in which said moving boundary of the electrolyte layer progressively increases an area covered by said electrolyte layer, and said moving boundary of the second electrode layer progressively decreases an area covered by said second electrode layer.

5. The display of claim 4 in which said first electrode layer covers a fixed area that is not affected by said moving boundaries of the electrolyte layer and the second electrode layer.

6. The display of claim 1 in which said first and second electrodes are relatively positioned so that at least portions of said first and second electrode layers are laid out side-by-side.

7. The display of claim 6 in which said second electrode layer has an extended portion supporting a switch contact for opening and closing an electronically conductive pathway between said first and second electrode layers.

8. The display of claim 6 in which said electrolyte layer overlaps a larger portion of said first electrode layer than said second electrode layer.

9. The display of claim 8 in which adjacent portions of said first and second electrode layers have an irregular-shaped lateral interface to enhance an electrochemical interaction between the electrode layers.

10. The display of claim 8 in which one of said first and second electrodes is funnel-shaped to promote migration of the electrolyte layer.

11. The display of claim 10 in which said second electrode is funnel-shaped having a wide end adjacent to said first electrode.

12. The display of claim 6 in which said first electrode layer overlaps said second electrode layer.

13. The display of claim 12 in which a dielectric layer electronically separates said first and second electrode layers.

14. The display of claim 1 in which said electrolyte layer has a limited viscosity that permits migration of said electrolyte boundary with said moving boundary of the second electrode layer.

15. The display of claim 14 in which said electrolyte layer is formed by an electrolytic adhesive.

16. The display of claim 14 in which said electrolyte layer is formed by an electrolytic gel.

17. The display of claim 1 in which said second electrode layer is supported on a transparent substrate, and said moving boundary of the second electrode layer gradually reveals a graphic image that becomes visible through said transparent substrate.

18. An irreversible electrochemical display comprising:
   first and second electrode layers and an electrolyte layer occupying distinct areas of a substrate;
   said electrolyte layer being in operative contact with said first and second electrode layers for completing an ionically conductive pathway between said first and second electrode layers;
   an electronically conductive pathway that is closeable in support of an electrochemical reaction that progressively increases the area of the substrate occupied by said electrolyte layer and progressively decreases the area of the substrate occupied by said second electrode layer; and
   said progressively increasing area of the electrolyte layer and said progressively decreasing area of the second electrode layer providing an irreversible indication of change at a rate governed by the electrochemical reaction.

19. The display of claim 18 in which the progressively increasing area of said electrolyte layer corresponds to the progressively decreasing area of said second electrode layer.

20. The display of claim 19 in which the area of the substrate occupied by said first electrode layer remains substantially constant throughout the electrochemical reaction.

21. The display of claim 18 in which said second electrode has a first portion in contact with said electrolyte layer and a second portion out of contact with said electrolyte layer, and said second portion of the second electrode is substantially larger in area than said first portion of the second electrode.

22. The display of claim 21 in which said first and second portions of the second electrode layer are separated by an interface with said electrolyte layer.

23. The display of claim 22 in which said progressive changes in area of the electrolyte layer and the second electrode layer occur at said interface.

24. The display of claim 23 in which said second portion of the second electrode layer has a length and a width, said length of said second electrode is greater than said width, and said interface extends in a direction across said width.

25. The display of claim 24 in which said second portion of the second electrode layer includes two ends and a middle along its length.

26. The display of claim 25 in which one of said ends is located on said substrate at a longer distance from said first electrode layer than from said middle of the second electrode.

27. The display of claim 25 in which both of said ends are located on said substrate at a shorter distance from said first electrode layer than from said middle of the second electrode.

28. The display of claim 25 in which one of said ends is ionically coupled to said first electrode through said electrolyte layer, and the other of said ends is electronically coupled to said first electrode through said electronically conductive pathway.

29. The display of claim 18 in which adjacent portions of said first and second electrode layers have an irregular-shaped lateral interface to enhance the electrochemical interaction between the electrode layers.

30. The display of claim 18 in which one of said first and second electrodes is funnel-shaped to promote migration of the electrolyte layer.

31. The display of claim 30 in which said second electrode is funnel-shaped having a wide end adjacent to said first electrode.

32. The display of claim 24 further comprising a graphics layer having a window aligned with said second electrode layer to reveal a progressive movement of said interface along said length of the second electrode.

33. The display of claim 24 further comprising a graphics layer having a window aligned with a limited portion of said length of the second electrode layer so that an initial movement of said interface along said length of the second electrode is blocked from view and a subsequent movement of said interface along said length of the second electrode is revealed as an indication of a predetermined amount of progress of the electrochemical reaction.

34. The display of claim 24 further comprising a graphics overlay having a first window aligned with said first portion of the second electrode layer and a second window aligned with said second portion of the second electrode layer to reveal initial and subsequent indications of the progress of the electrochemical reaction.

35. The display of claim 18 in which said electrolyte layer overlaps said first electrode layer within a first common area of said substrate.

36. The display of claim 35 in which said electrode overlaps a substantial portion of the first electrode layer.

37. The display of claim 35 in which said first and second electrodes overlap each other within a second common area of said substrate.

38. The display of claim 37 in which said first and second electrodes are separated within said second common area by a dielectric layer that electronically isolates said first and second electrode layers.

39. The display of claim 18 in which said electrolyte layer is a first of two electrolyte layers and further comprising third and fourth electrode layers and a second electrolyte layer.

40. The display of claim 39 in which said second electrolyte layer forms an ionically conductive pathway between said third and fourth electrode layers, and said electronically conductive pathway interconnects said first electrode layer with said third electrode layer and interconnects said second electrode layer with said fourth electrode layer.

41. The display of claim 40 in which said third and fourth electrode layers have different electrode potentials that generate a flow of current for assisting the electrochemical reaction that progressively decreases the area of the substrate occupied by said second electrode layer.

42. The display of claim 41 in which said first and second electrode layers have substantially equal electrode potentials.

43. The display of claim 42 in which three of said four electrode layers have the same electrode potential.

44. An electrochemical display comprising:

first and second electrode layers and an electrolyte layer each occupying distinct areas of one or more substrates;

an electronically conductive pathway for interconnecting said first and second electrode layers independent of said electrolyte layer;

an ionically conductive pathway for interconnecting said first and second electrode layers being formed at least in part by said electrolyte layer;

said electrolyte layer being initially operatively isolated from at least one of said first and second electrode layers for interrupting said ionically conductive pathway between said first and second electrode layers;

said ionically conductive pathway being closeable in support of an electrochemical reaction that progressively increases the area occupied by said electrolyte layer and progressively decreases the area occupied by said second electrode layer; and said progressively increasing area of the electrolyte layer and said progressively decreasing area of the second electrode layer providing an indication of change at a rate governed by the electrochemical reaction.

45. The display of claim 44 in which the progressively increasing area of said electrolyte layer corresponds to the progressively decreasing area of said second electrode layer.

46. The display of claim 45 in which the area occupied by said first electrode layer remains substantially constant throughout the electrochemical reaction.

47. The display of claim 44 in which the progressive changes in the areas of the second electrode layer and the electrolyte layer take place at a common moving boundary that extends the ionically conductive pathway from the first electrode layer.

48. The display of claim 44 further comprising a protective layer that covers said electrolyte layer prior to completion of the ionically conductive pathway.

49. The display of claim 48 in which said electrolyte layer is made of an electrolytic adhesive, and said protective layer is a release layer.

50. A method of producing a progressive change in an electrochemical display cell comprising the steps of:

arranging a first electrode layer in an overlapping relationship with an electrolyte layer;

locating a boundary of the electrolyte layer in contact with a first portion of a second electrode layer providing an ionically conductive pathway between the first and second electrodes;

arranging a second portion of the second electrode layer out of contact with the electrolyte layer;

completing an electronically conductive pathway between the first and second electrodes;

initiating an electrochemical reaction eroding the first portion of the second electrode layer at the boundary of the electrolyte layer; and continuing the electrochemical reaction extending the boundary of the electrolyte layer from the first electrolyte layer and progressively eroding the second portion of the second electrode layer at the extending boundary of the electrolyte layer for producing a progressive change useful for purposes of display.

51. The method of claim 50 in which said advancing boundary of the electrolyte increases a length of an ionically conductive pathway between said first and second electrode layers.

52. The method of claim 50 including a further step of adjusting a rate of the boundary advancement to perform a timing function.

53. The method of claim 52 in which said rate is adjusted by adjusting viscosity of the electrolyte layer.

54. The method of claim 53 in which said electrolyte layer is made of an electrolytic gel to advance said rate of boundary advancement.

55. The method of claim 53 in which said electrolyte layer is made of an electrolytic adhesive to retard said rate of boundary advancement.

56. The method of claim 52 in which said rate is adjusted by adjusting ionic conductivity of the electrolyte layer.

57. The method of claim 52 in which said rate is adjusted by adjusting a shape of the electrolyte layer.

58. The method of claim 52 in which said rate is adjusted by adjusting a shape of said second electrode layer.

59. The method of claim 52 in which said rate is adjusted by adjusting a thickness of said second electrode layer.

60. The method of claim 50 including the further step of forming the first and second electrode layers with different electrode potentials.

61. The method of claim 50 in which said second electrode layer is made of a thin film capable of undergoing an electrochemical reaction that results in a progressive disappearance of said second electrode layer behind said receding boundary of the second electrode layer.

62. A method of producing a progressive change in an electrochemical display cell comprising the steps of:

arranging first and second electrode layers and an electrolyte layer on a substrate, each occupying distinct areas of the substrate;

positioning the electrolyte layer in contact with the first and second electrode layers for completing an ionically conductive pathway between the first and second electrode layers;

supporting a flow of current along an electronically conductive pathway between the first and second electrode layers;

initiating an electrochemical reaction that progressively increases the area of the substrate occupied by the electrolyte layer and progressively decreases the area of the substrate occupied by the second electrode layer; and providing a viewing opportunity for observing the decreasing area of the second electrode layer as an irreversible indication of change at a rate governed by the electrochemical reaction.

63. The method of claim 62 in which the progressively increasing area of said electrolyte layer corresponds to the progressively decreasing area of said second electrode layer.

64. The method of claim 63 in which the area of the substrate occupied by said first electrode layer remains substantially constant throughout the electrochemical reaction.

65. The method of claim 62 in which said step of arranging includes arranging the first and second electrode layers with an irregular-shaped lateral interface.

66. The method of claim 65 in which the irregular-shaped interface has a saw-tooth pattern.

67. The method of claim 62 in which said step of arranging includes arranging one of the first and second electrode layers with a funnel shape to promote migration of the electrolyte layer.

68. The method of claim 67 in which said step of arranging includes arranging the second electrode layer with a funnel shape having wide and narrow ends and positioning the wide end of the second electrode layer adjacent to the first electrode layer.

* * * * *